(12) United States Patent
Bosco

(10) Patent No.: US 9,033,666 B2
(45) Date of Patent: May 19, 2015

(54) MEANS FOR LOCKING A SEALING RING ON A TURBINE DISK

(75) Inventor: Franck Emmanuel Bosco, Sainte Genevieve des Bois (FR)

(73) Assignee: SNECMA, Paris (FR)

( * ) Notice: Subject to any disclaimer, the term of this patent is extended or adjusted under 35 U.S.C. 154(b) by 506 days.

(21) Appl. No.: 13/575,234

(22) PCT Filed: Jan. 28, 2011

(86) PCT No.: PCT/FR2011/050183
§ 371 (c)(1),
(2), (4) Date: Aug. 22, 2012

(87) PCT Pub. No.: WO2011/092439
PCT Pub. Date: Aug. 4, 2011

(65) Prior Publication Data
US 2012/0315142 A1  Dec. 13, 2012

(30) Foreign Application Priority Data
Jan. 29, 2010  (FR) ...................................... 10 50628

(51) Int. Cl.
*F01D 5/08*  (2006.01)
*F01D 5/30*  (2006.01)

(52) U.S. Cl.
CPC .............. *F01D 5/3015* (2013.01); *F01D 5/082* (2013.01); *F05D 2260/31* (2013.01); *F01D 5/081* (2013.01); *F05D 2260/33* (2013.01)

(58) Field of Classification Search
CPC ....... F01D 5/082; F01D 5/3015; F01D 5/326; F05D 2240/55; F05D 2260/31
See application file for complete search history.

(56) References Cited

U.S. PATENT DOCUMENTS

| 4,803,893 | A  | * | 2/1989 | Bachinski ...................... 464/180 |
| 5,211,407 | A  | * | 5/1993 | Glynn et al. ................... 277/632 |
| 5,277,548 | A  | * | 1/1994 | Klein et al. ............... 416/193 A |
| 6,494,684 | B1 |   | 12/2002 | Wagner |
| 2005/0175459 | A1 | * | 8/2005 | Gagner ...................... 416/204 R |

(Continued)

FOREIGN PATENT DOCUMENTS

| EP | 1 096 107 | 5/2001 |
| EP | 1 439 282 | 7/2004 |

(Continued)

OTHER PUBLICATIONS

International Search Report Issued Jun. 15, 2011 in PCT/FR11/050183 Filed Jan. 28, 2011.

*Primary Examiner* — Ninh H Nguyen
(74) *Attorney, Agent, or Firm* — Oblon, McClelland, Maier & Neustadt, L.L.P.

(57) ABSTRACT

A mechanism compressing a sealing ring of a cooling circuit of blades of a turbine engine against a turbine wheel supporting the blades, the wheel supporting on a downstream surface thereof an annular flange positioned radially and defining with the surface a groove configured to house the sealing ring. The flange includes at least two cut-outs on the edge thereof located opposite the bottom of the groove, to form windows for axial insertion in the groove for claws supported by the circumference of the ring facing the groove of the wheel. The mechanism includes a bolt tab configured to be positioned in the groove between the surface of the wheel and the ring, and a clamping shaped to be supported by the surface of the wheel and to engage with the bolt to ensure that the ring is compressed against the flange.

9 Claims, 5 Drawing Sheets

(56) References Cited

U.S. PATENT DOCUMENTS

2005/0271511 A1 12/2005 Pasquiet
2006/0018757 A1 1/2006 Wagner
2006/0088419 A1 4/2006 Hermiston et al.

FOREIGN PATENT DOCUMENTS

| | | |
|---|---|---|
| EP | 1 584 794 | 10/2005 |
| EP | 1 607 579 | 12/2005 |
| EP | 1 650 406 | 4/2006 |

\* cited by examiner

MEANS FOR LOCKING A SEALING RING ON A TURBINE DISK

The field of the present invention is that of aeronautical turbomachines and, more particularly, that of the component parts that make up the turbine or turbines of these turbomachines.

Aeronautical turbomachines are conventionally made up of a set of assembled modules comprising, in the direction in which the air flows, one or more compressors, a combustion chamber, one or more turbines which drive the compressor or compressors via drive shafts by tapping power from the gases leaving the combustion chamber and, on the outlet side, either a nozzle in which the burnt gases are ejected to produce thrust or a free turbine which recuperates the energy of the gases in order to produce mechanical power.

The turbines bear blades which are subjected to the high temperature of the gases leaving the combustion chamber and which need to be cooled in order to be able to withstand the high thermal and mechanical stresses to which they are subjected. This air is bled off downstream of the compressor or compressors and carried to the turbine blades which they enter at the roots thereof. The way in which the blade ventilation circuit works is to admit the air into the blade root, channel it through passages or cavities and have it reemerge at the blade tip. Because the air arrives under the root of the blades, sealing is achieved upstream and downstream of the disk that supports them so that the cooling air does actually enter the cooling passages.

In order to provide this sealing downstream of the blade roots, use is made, as shown in FIG. 1, of a component known as a turbine sealing ring which is positioned against the radial face of the disk and has the main function of axially retaining the blades once they have been inserted into the blade pockets in the turbine disk. The downstream sealing ring is held pressed against the disk, in order to achieve the desired sealing, by a deformable circular component known as a retaining ring, which is itself fitted into a groove made within the thickness of the turbine disk.

Examples of such setups are described in patent applications EP 1584794 and EP 1439282 in the name of the applying company.

In the order of assembly, the retaining ring is fitted before the sealing ring is installed on the disk. It is kept under compression in the bottom of the groove using a tool while the sealing ring is being fitted. The tool that holds the retaining ring in position is then withdrawn and the retaining ring released. The retaining ring naturally positions itself under the sealing ring, preventing the latter from becoming disengaged and ensuring sealing with respect to the turbine disk.

One of the disadvantages associated with this type of setup lies in the fact that the sealing ring retains a certain degree of freedom and can, during operation, shift tangentially. Such movement gives rise to detrimental wear and to the risks of impaired blade retention and/or impaired sealing. A second disadvantage stems from the fact that the retaining ring is tricky to produce and therefore has a high associated production cost.

Finally, this setup is characterized by an interference between the sealing ring and the clamping means, before the means is tightened to clamp, and this complicates the fitting of the sealing ring.

It is an object of the present invention to redress these disadvantages by proposing a means of locking a turbine sealing ring which does not have at least some of the disadvantages of the prior art and which, in particular, does not interfere with the sealing ring when the latter is being fitted.

To this end, one subject of the invention is a means of pressing a sealing ring of a turbomachine blade-cooling circuit against a turbine disk bearing said blades, said disk on its downstream face bearing an annular flange oriented radially and delimiting, with said face, a groove able to accept said sealing ring, said annular flange comprising at least two cutouts on its periphery situated opposite the bottom of the groove so as to form apertures via which lugs borne by the circumference of said sealing ring facing the groove of the disk can enter said groove axially, said means comprising a lock able to be positioned in the groove between said face of the disk and said sealing ring, characterized in that it further comprises a clamping means configured to rest against said face of the disk and collaborate with said lock in order to press said sealing ring against said annular flange.

The resting against the face of the disk makes it possible to avoid any interference between the clamping means and the sealing ring prior to the clamping operation and therefore allows the sealing ring to be fitted more easily into the groove in the disk.

For preference, the clamping means is a screw and the lock is a nut having at least one wing extending tangentially into the groove.

The claimed configuration means that only local clamping, spread around the circumference, need be performed, without the need to fit an annular lock. These local locks are therefore relatively easy to position.

Advantageously, the clamping screw comprises a threaded first part able to collaborate with a tapped thread of said nut, and a second part, of a diameter smaller than that of said tapped thread, able to pass through said nut to rest against said face of the disk and push the nut and the sealing ring back against the annular flange.

For preference, the external face of the second part is domed to collaborate with a depression hollowed into said face of the disk.

The invention also relates to a turbine disk for a turbomachine bearing, on its downstream face, an annular flange oriented radially and delimiting, with said face, a groove able to accept a sealing ring of the cooling circuit for the blades carried by said disk, characterized in that said annular flange further comprises at least one first opening capable of allowing the clamping means of a pressing means as described hereinabove, to pass through it.

It also relates to a sealing ring of annular shape for sealing a turbomachine blade-cooling circuit, comprising lugs on one of its circumferences, characterized in that at least one of the lugs comprises a second opening able to allow the clamping means of a pressing means as described hereinabove to pass through it to allow said clamping means to rest against the downstream face of the disk that bears said blades.

It also relates to such a turbine disk equipped with such a sealing ring, the sealing ring being held against an annular flange of said disk by a pressing means as described hereinabove.

The invention finally relates to a turbomachine turbine module comprising such a disk and to a turbomachine comprising such a turbine module.

The invention will be better understood, and other objects, details, features and advantages thereof will become more clearly apparent, during the course of the following detailed explanatory description of one embodiment of the invention which is given by way of purely illustrative and nonlimiting example with reference to the attached schematic drawings.

Figure 1:
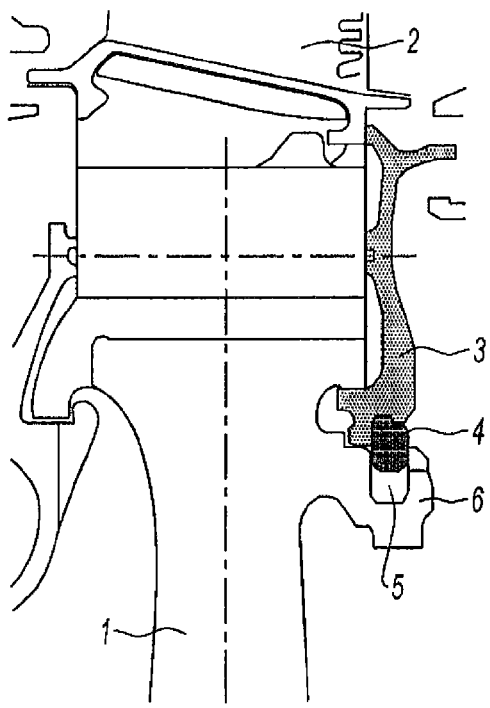
FIG. 1 is a view in cross section of a device for attaching a sealing ring to a turbine disk according to the prior art.

Reference is made to the FIG. 1 which shows a turbine disk 1 according to the prior art, bearing a blade 2, against which is pressed a turbine sealing ring 3 which holds the blades 2 in position in the blade seats in the disk 1 and forces the cooling air to flow through the ventilation passages of these blades thereby forming a sealing barrier for this air downstream of the disk. The sealing ring 3 is pressed against the radial face of the disk 1 and held in place by the retaining ring 4. This retaining ring is fitted into a groove 5 formed laterally with respect to the radial face of the disk by means of an annular flange 6 which forms a step oriented parallel to the face of the disk. The annular flange does not extend diametrically beyond the inside diameter of the sealing ring 3 which means that the latter can be fitted against the disk at the time of assembly. The retaining ring 4 has a broken circular shape and can be deformed using a suitable tool so that its diameter can be reduced and that it can be fitted into the groove 5 and allow the sealing ring 3 to pass when it is being installed against the disk 1.

Figure 2:
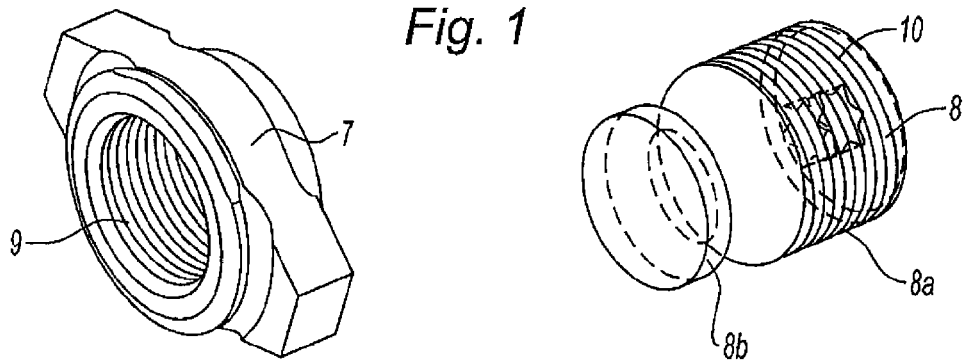
FIG. 2 is a perspective view from a first direction of a sealing ring lock and of its locking screw, according to one embodiment of the invention.
Figure 3:
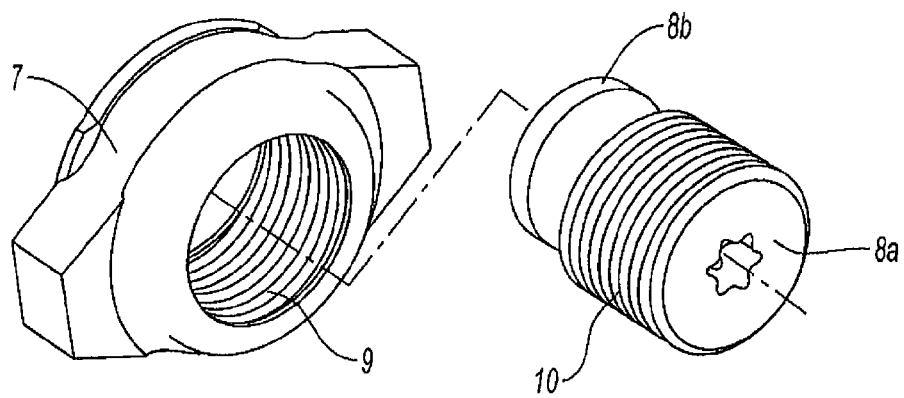
FIG. 3 is a perspective view from a second direction of a sealing ring lock and of its locking screw, according to one embodiment of the invention.
Figure 4:
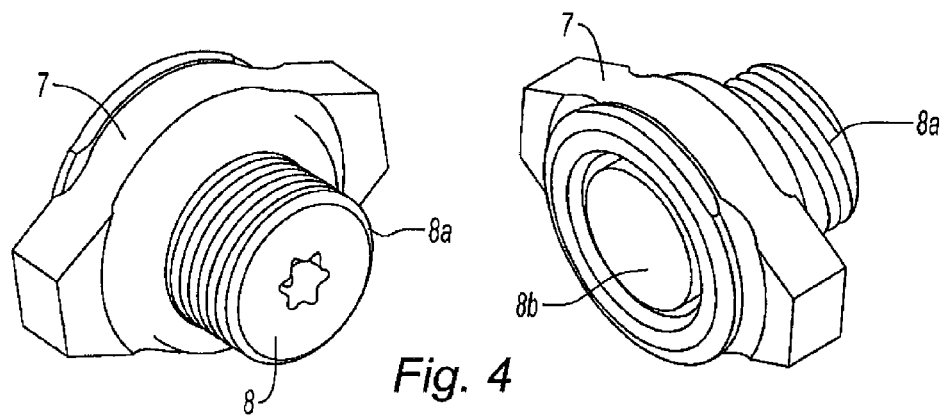
FIG. 4 is a perspective view, from the previous two directions, of a sealing ring lock and of its locking screw, according to one embodiment of the invention, after assembly.

Reference is now made to FIGS. 2 to 4 which show an assembly according to the invention, consisting of a sealing ring lock 7 and of a locking screw 8 for locking this lock. The lock has the form of a hollow cylinder the height of which is slightly smaller than the width of the groove 5 and which is extended laterally by two wings 7a and 7b the purpose of these being to prevent the lock from turning when it is in position in the groove 5 and to press the sealing ring 3 against the disk at the end of assembly. The inside diameter of the lock comprises a tapped thread 9 able to collaborate with a corresponding screw thread 10 on the external part of the locking screw 8.

The locking screw 8 comprises a cylindrical first part 8a that bears the screw thread 10 and is continued by a cylindrical second part 8b connected to the first part 8a by a connecting bridge (not depicted in FIGS. 2 to 4). On its external face, the cylindrical first part comprises a conventional means of accepting a screw-driving means such as a screwdriver. The cylindrical second part has a diameter slightly smaller than that of the first part 8a so that it can pass freely through the tapping 9. The external face of the second part 8b is itself slightly domed (although that is not essential) so that it can fit a depression hollowed for that purpose into the lateral face of the turbine disk 1.

Figure 5:
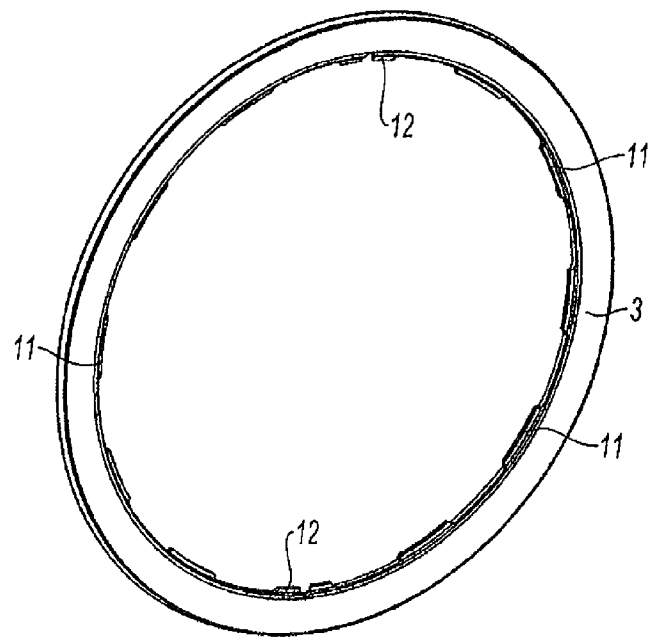
FIG. 5 is a perspective view of a sealing ring according to one embodiment of the invention.
Figure 6:
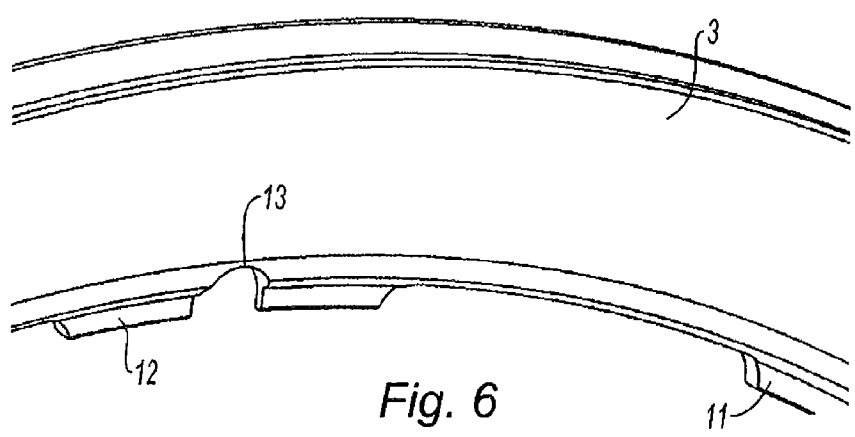
FIG. 6 is a perspective view of a detail of a sealing ring according to one embodiment of the invention.

Reference is made to FIGS. 5 and 6 which show a turbine sealing ring 3 which is essentially in the shape of a flat disk comprising, distributed uniformly around its internal edge, radial protrusions or lugs 11. Two of these lugs 12, which are diametrically opposed, are cut to form a notch 13 in the manner of a countersink, the diameter of which is greater than that of the locking screw 8 and which is intended to allow one of such locking screws to pass.

Figure 7:
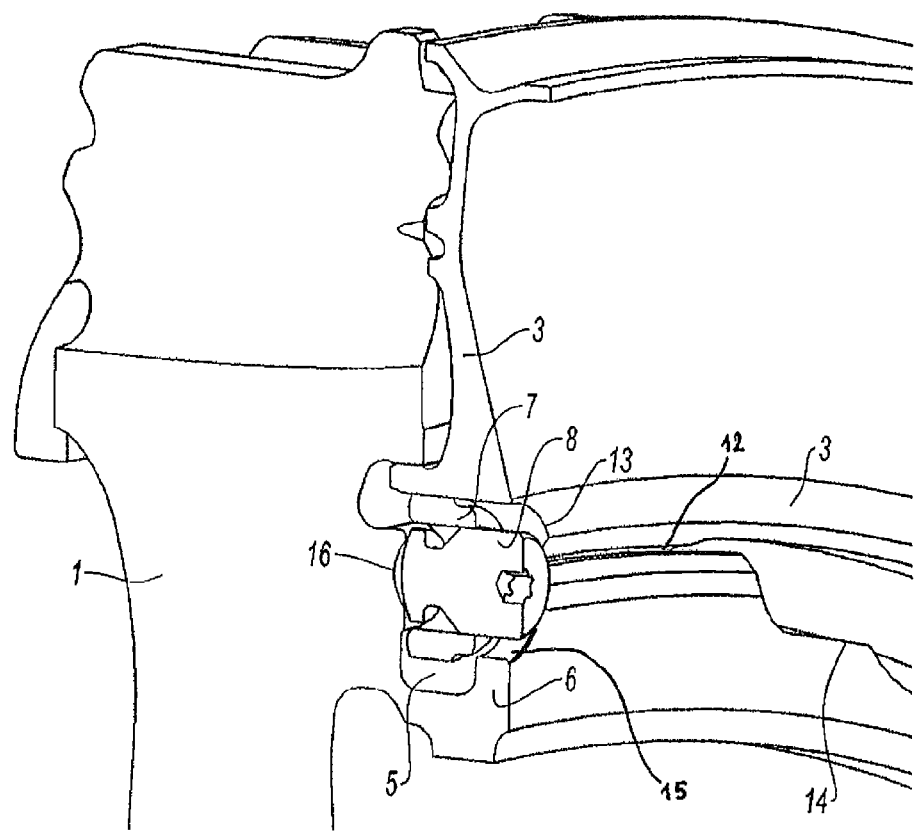
FIG. 7 is a view in cross section of a turbine disk equipped with a sealing ring immobilized by a sealing ring lock according to one embodiment of the invention.
Figure 8:
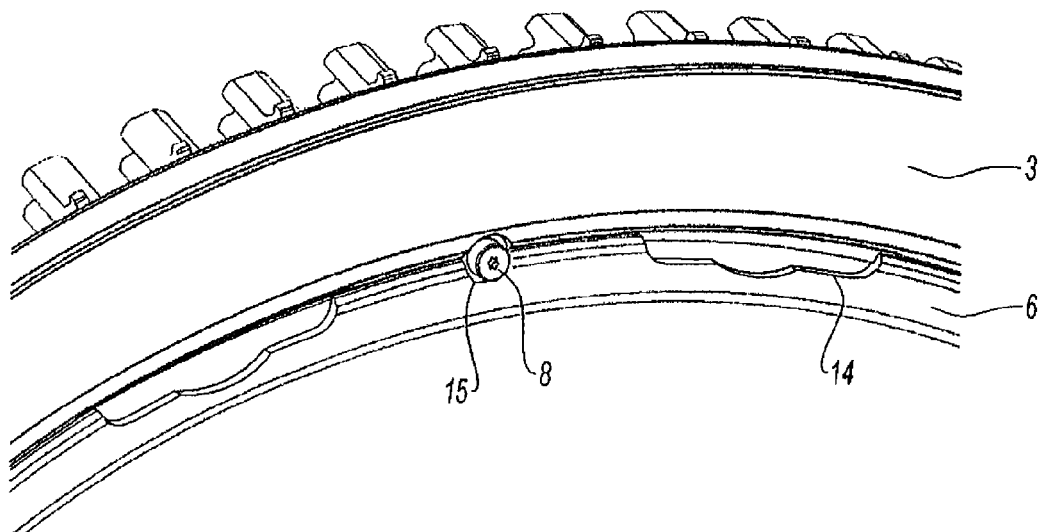
FIG. 8 is a perspective view of a detail of a turbine disk equipped with a sealing ring immobilized by a sealing ring lock according to one embodiment of the invention.
Figure 9:
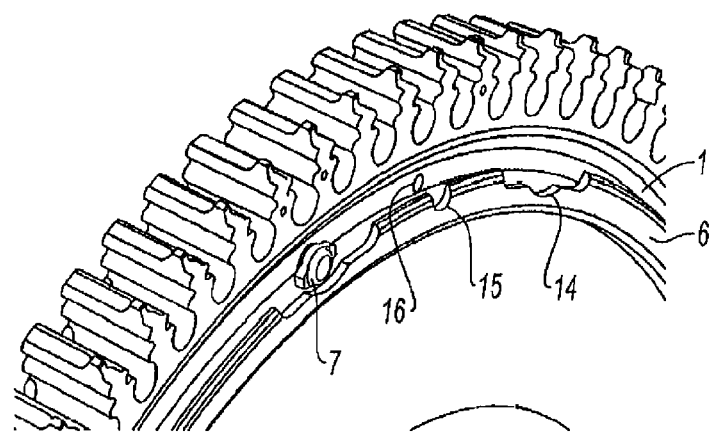
FIG. 9 is a perspective view of a detail of a turbine disk in the groove of which the sealing ring lock according to one embodiment of the invention is positioned.
Figure 10:
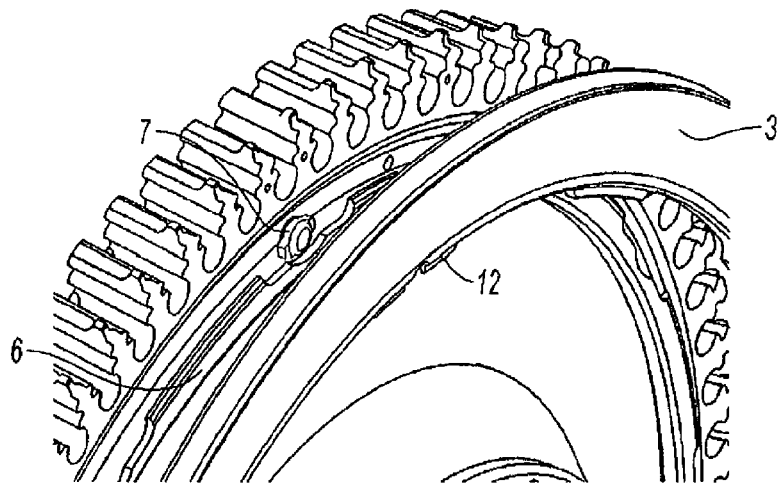
FIG. 10 is a perspective view of a detail of a sealing ring and of a turbine disk, in the groove of which a sealing ring lock according to one embodiment of the invention is positioned.
Figure 11:
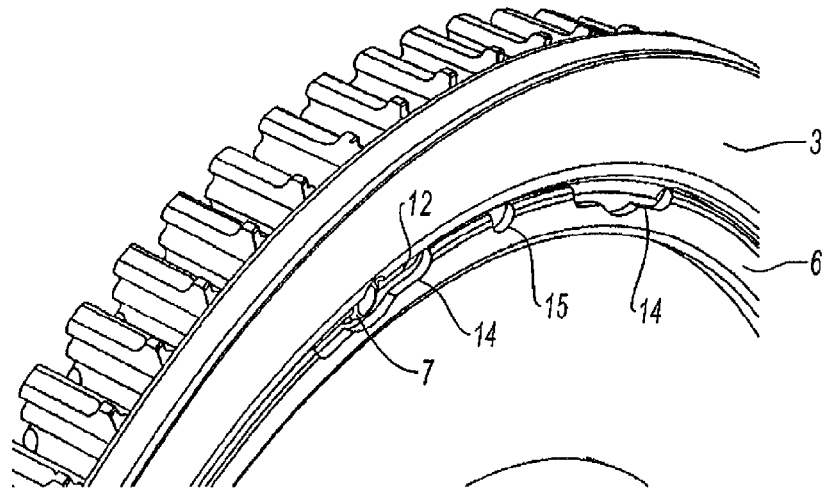
FIG. 11 is a perspective view of a detail of a sealing ring fitted into the groove of a turbine disk, according to one embodiment of the invention.
Figure 12:
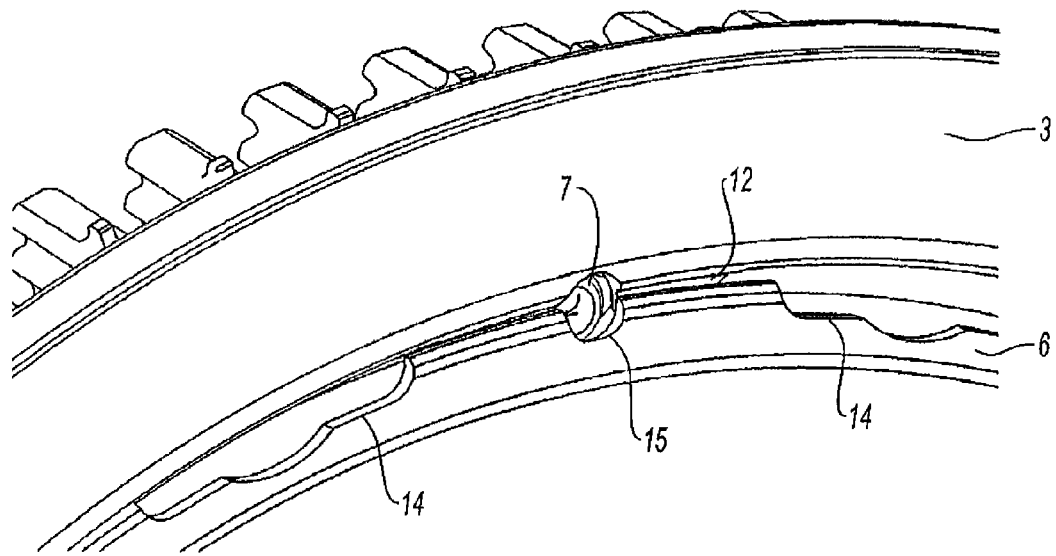
FIG. 12 is a perspective view of a detail of a sealing ring in its definitive position in the groove of a turbine disk, according to one embodiment of the invention.
Figure 13:
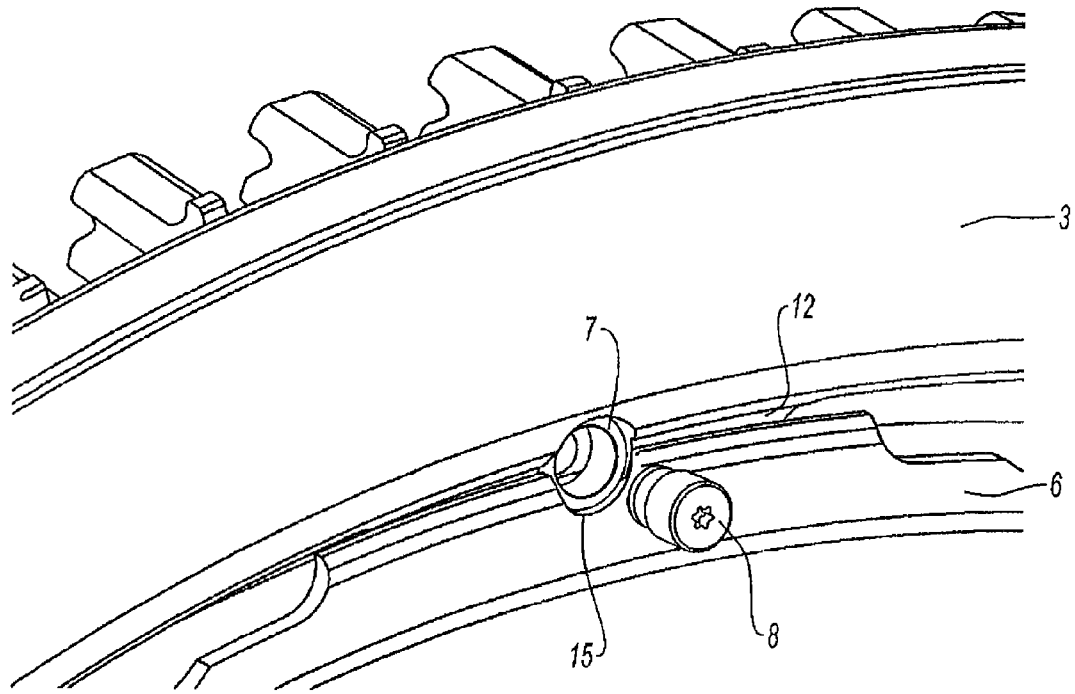
FIG. 13 is a perspective view of a detail of a sealing ring in its definitive position in the groove of a turbine disk and of its locking screw, before fixing.

FIGS. 7 and 8 show a disk 1 fitted with a sealing ring 3 held in place by a lock 7 associated with its locking screw 8. The disk 1 comprises, on the annular flange 6, introduction apertures 14 the number and angular sectors of which correspond to those of the lugs 11 of the sealing ring. In addition, two lunula-shaped depressions 16 are hollowed into the thickness of the disk 1, facing a notch 15 formed axially in this annular flange. These lunulas preferably have a shape that is the female equivalent to the domed shape of the external face of the second part 8b of the locking screw. Moreover, the lock 7 and its locking screw 8 are designed to pass through the sealing ring at its notch 13 and through the annular flange 6 of the disk at its notch 15.

FIGS. 9 to 13 show the successive steps in installing a sealing ring 3 on a disk 1, and these will now be discussed in detail.

With respect to the prior art, the disk 1, by comparison with the disks of the prior art, has introductory apertures 14 cut into the external surface of the annular flange 6, two diametrically opposed first notches 15 and two lunulas 16 situated on the face of the disk facing the two first notches 15.

Likewise, the sealing ring 3 according to the invention is modified so that it has lugs 11 distributed evenly about the circumference of its inside diameter. The purpose of these lugs is to position themselves behind the annular flange 6 of the disk 1, between the introductory apertures 14, and act as bearers for the sealing ring when it is pressed against the wall of the annular flange 6 which opens onto the groove 5. As indicated hereinabove, two, although this number two is not essential, second notches 13 are made in diametrically opposed lugs 12.

The fitting of the sealing ring onto the disk begins with two locks 7 being fitted into the groove 5 of the disk 1, preferably at an introductory aperture 14 near one of the two lunulas 16. These lunulas in fact correspond to the final position that the locks will occupy at the end of assembly. The sealing ring 3 is then likewise introduced into this groove 5, the lugs 11 being positioned facing the introductory apertures 14 and the two lugs 12 having a notch 13 being themselves positioned facing the two locks 7.

The second step of assembly is to turn the sealing ring 3 and each lock 7 in the groove so that they and the second notches 13 will position themselves facing the first notches 15 and the lunulas 16.

In this position, it is possible to insert the locking screw 8 through the notch 15 in the annular flange 6 and engage its screw thread in the tapped thread 9 of the lock 7. As it is screwed in, the screw 8 first of all penetrates the groove 5 until its second part 8b comes into abutment against the face of the disk 1 in the region of the lunula 16. Then the pressure applied by screwing tends to refine the positioning of the sealing ring 3 by causing the domed shape of the second part 8b of the screw 8 to position itself very exactly opposite the lunula 16. Finally, when the tip of the screw is in abutment in the lunula, further screwing-in causes the lock 7 to move in the direction that moves it away from the face bearing the lunula 16. Its wings 7a and 7b simultaneously drive the sealing ring 3 that they are clamping against the annular flange 6. When the lock 7 and its wings come into abutment against the annular flange 6, its rotation ceases and it creates a pressure pressing the sealing ring against the annular flange under the action of the tightening torque applied to the screw 8. The screw thread 10 on the screw 8 and the tapped thread 9 on the lock 7 are specified such that the shifting of the sealing ring is minimal and that in this way the sealing function of sealing between the sealing ring 3 and the disk 1 is not impaired.

The pressure applied to the sealing ring 3 against the annular flange provides good sealing ring retention and prevents any rotation of this sealing ring, thus eliminating the disadvantages encountered in the prior art.

The recoil of the sealing ring 3 with respect to the face of the disk 1 as the locking screw 8 is tightened does not have any unfavorable impact on the sealing of the blade-cooling circuit or on the axial retention of the blades because the sealing ring is forceably positioned, which means pressed firmly against the disk with elastic deformation. Sealing is also maintained, even if the sealing ring recoils, by a sealing tongue pressed forceably into a groove belonging to the disk.

The invention has been described with the installation of two diametrically opposed locks. It is quite clear that it could just as well be performed with a higher number of locks which would preferably, but not essentially, be positioned at uniform circumferential intervals about the disk 1 and the sealing ring 3.

Although the invention has been described in conjunction with one particular embodiment, it is quite evident that it comprise all technical equivalents of the means described and combinations thereof where these fall within the scope of the invention.

The invention claimed is:

1. A means of pressing a sealing ring of a turbomachine blade-cooling circuit against a turbine disk bearing blades, the disk on its downstream face bearing an annular flange oriented radially and delimiting, with the face, a groove configured to accept the sealing ring, the annular flange comprising at least two cutouts on its periphery situated opposite the bottom of the groove so as to form apertures via which lugs borne by the circumference of the sealing ring facing the groove of the disk can enter the groove axially, the means comprising:
    a lock configured to be positioned in the groove between the face of the disk and the sealing ring; and
    a clamping means configured to rest against the face of the disk and collaborate with the lock to press the sealing ring against the annular flange.

2. The pressing means as claimed in claim 1, in which the clamping means includes a screw and the lock includes a nut including at least one wing extending tangentially into the groove.

3. The pressing means as claimed in claim 2, in which the clamping screw comprises a threaded first part configured to collaborate with a tapped thread of the nut, and a second part, of a diameter smaller than that of the tapped thread, configured to pass through the nut to rest against the face of the disk and push the nut and the sealing ring back against the annular flange.

4. The pressing means as claimed in claim 3, in which the external face of the second part is domed to collaborate with a depression hollowed into the face of the disk.

5. A turbine disk for a turbomachine bearing, on its downstream face, an annular flange oriented radially and delimiting, with the face, a groove configured to accept a sealing ring of the cooling circuit for blades carried by the disk, the annular flange further comprises at least one first opening capable of allowing the clamping means of a pressing means as claimed in claim 1 to pass through it.

6. The turbine disk as claimed in claim 5, comprising a sealing ring, held against an annular flange of the disk by the pressing means.

7. A turbomachine turbine module comprising a disk as claimed in claim 6.

8. A turbomachine comprising a turbine module as claimed in claim 7.

9. A sealing ring of annular shape for sealing a turbomachine blade-cooling circuit, comprising lugs on one of its circumferences, wherein at least one of the lugs comprises a second opening configured to allow the clamping means of a pressing means as claimed in claim 1 to pass through it to allow the clamping means to rest against the downstream face of the disk that bears the blades.

* * * * *